June 3, 1941.  R. K. LORTON  2,244,207
HYDRAULIC POWER TRANSMISSION
Filed July 7, 1939  3 Sheets-Sheet 1

Inventor
RALPH K. LORTON,
Attorney

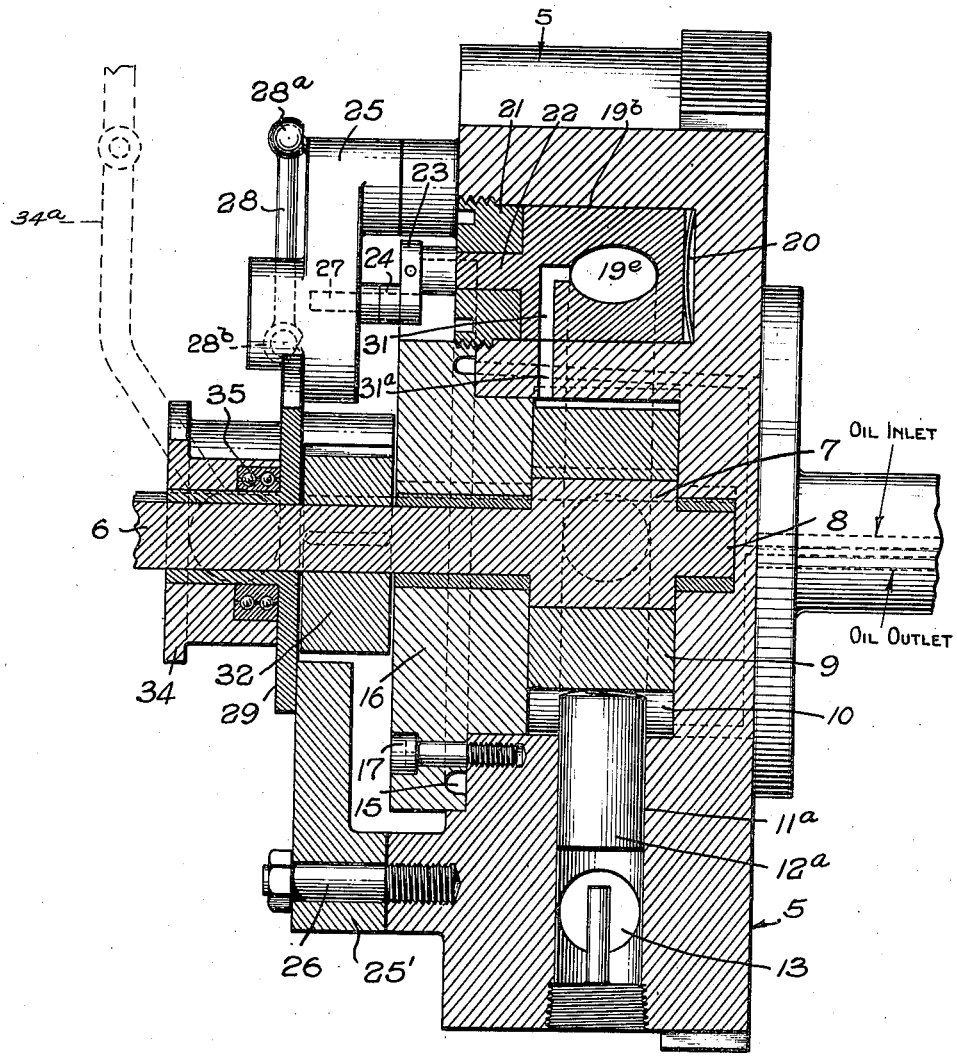

Inventor
RALPH K. LORTON,
Attorney

Patented June 3, 1941

2,244,207

UNITED STATES PATENT OFFICE 2,244,207

HYDRAULIC POWER TRANSMISSION

Ralph K. Lorton, New Castle, Ind.

Application July 7, 1939, Serial No. 283,309

14 Claims. (Cl. 192—57)

This invention relates to hydraulic or fluid power transmission devices or clutches and the primary object of the same is to provide an hydraulic or fluid transmission unit which will have a smooth yet positive action with a minimum of friction and wear of vital parts and which at the same time is of relatively simplified construction and may be installed within a limited space, such as within or as part of the fly-wheel of an internal combustion engine or other motive device.

Other objects and important features of improvement and advantage over prior known power transmission units of this type will become apparent in view of the following description taken in conjunction with the drawings, wherein:

Fig. 2 is a section taken substantially on the line 2—2, Fig. 1;

Figure 1:
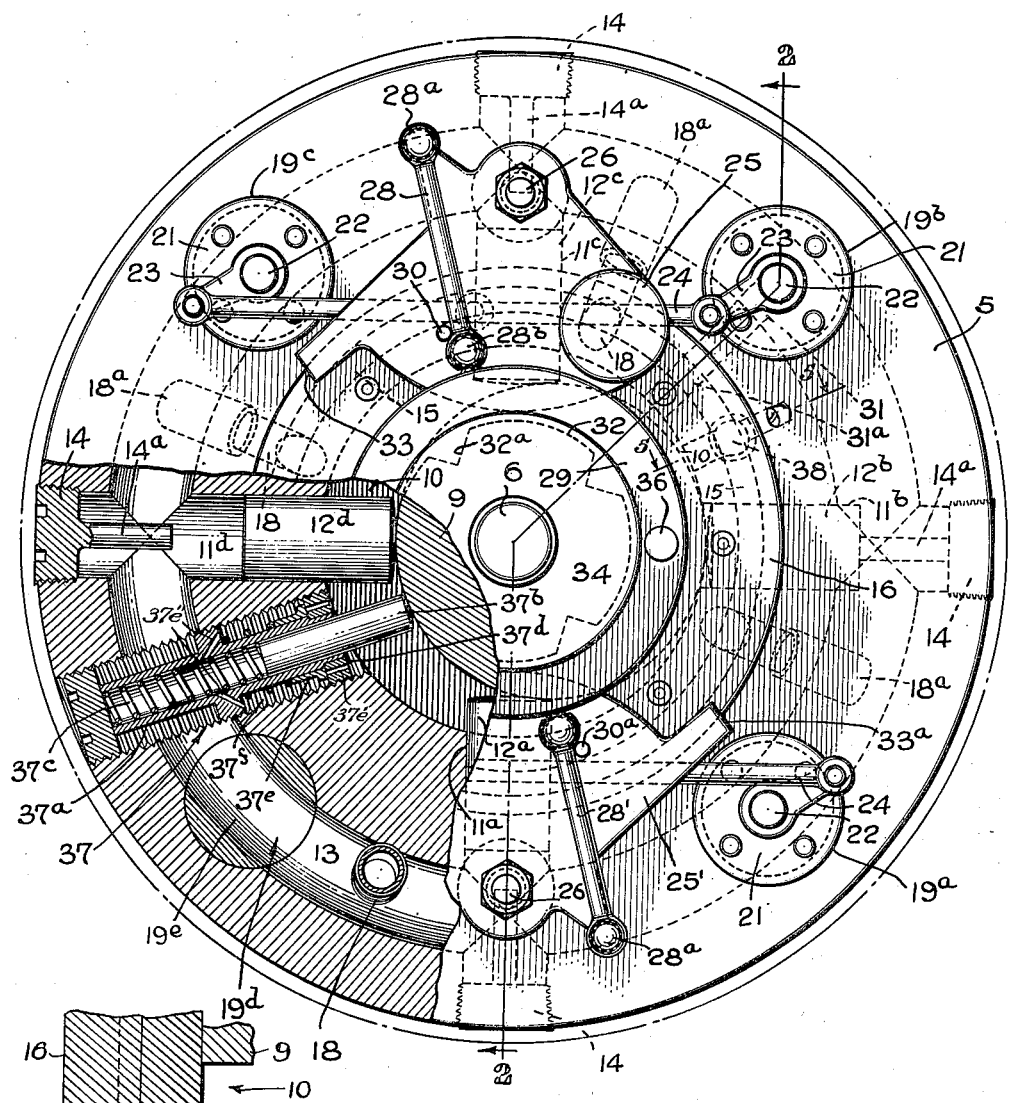
Fig. 1 is a view in front elevation, partly broken away, of a power transmission unit constructed in accordance with the features of the present invention.
Figure 5:
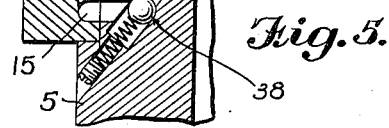
Fig. 5 is a sectional view taken substantially on the line 5—5, Fig. 1.

The improved unit is of that general type embodying radially movable clutch elements which are actuated by fluid pressure into gripping relation with a central drive member to thereby transmit motion through the unit to a driven member. Through a particular construction and arrangement of parts, the present improved unit is adapted for compact installation in the flywheel of an internal combustion engine to transmit power from the flywheel, which is secured to the motor crank shaft, through a gradual, smooth clutching action of radially movable pistons or plungers, to a propeller cam which has bearing in and is rotated with the flywheel by the clutching action of the radial pistons or plungers.

Referring to the drawings in detail, the numeral 5 generally designates a main circular housing which may be used as a flywheel for an internal combustion engine, or it may in certain installations be placed in the line of connection between the power plant and the machine or vehicle to be propelled. The central shaft, indicated at 6, may be the driven shaft and may be operatively connected to a drive member for such vehicle or other mechanism or machine to be driven or propelled and is provided with a propeller cam 7 illustrated as formed integrally therewith, the shaft terminating in a pilot bearing 8.

Mounted on the propeller cam 7 is a bearing member which has relative rotation with respect to the said cam so as to roll over the contact faces of the plungers coacting therewith and which will be hereafter described. This bearing may be a bushing, or it may be a ring with interposed roller or ball bearings, or analogous construction, the object being to interpose means between the cam 7 and plungers coacting therewith whereby friction through direct contact will be avoided. In this manner, wear on vital parts is materially reduced.

The propeller cam 7 is mounted in a chamber 10 which serves as a reservoir for a suitable fluid, preferably lubricating oil. Extending radially outwardly from the chamber 10 are a series of radial cylinders, preferably four, spaced ninety degrees apart and indicated at 11a, 11b, 11c, 11d, in which are mounted clutch elements in the form of plungers 12a, 12b, 12c and 12d. The inner ends of these plungers are adapted to contact the circumferential surface of the bearing ring 9 when driven inwardly by fluid pressure in a manner to be explained. At their outer extremities these pistons have limited movement into a circumferential channel 13, herein termed the "control channel," extreme outward movement being limited by stop members 14, which are adjustably threaded into the exterior or circumferential portion of the housing and each of which is provided with an inwardly projecting stop 14a.

Figure 4:
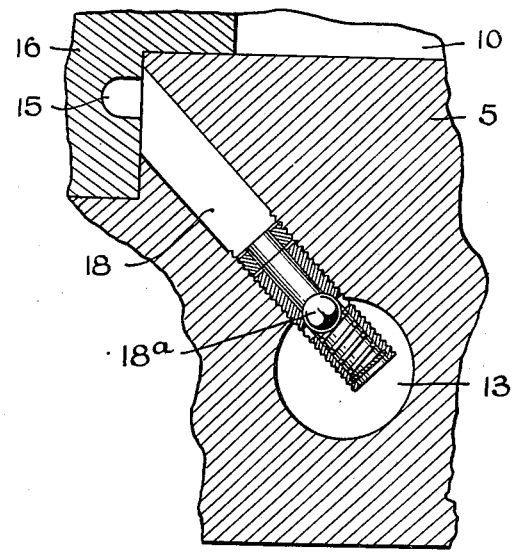

A channel 15, herein termed a "distributing channel" is also provided, and in the unit as constructed is formed in a back bearing housing 16 which is removably bolted to the main housing 5 by bolts 17. This channel communicates with the main control channel 13 through ports 18 each having therein a check valve 18a, note particularly Fig. 4. Thus, fluid may pass from the distributing channel 15 into the control channel 13, but this flow cannot be reversed except through a valved overload pressure port hereinafter described.

To control the pressure in the channel 13, a series of valves 19a, 19b, 19c and 19d are provided, each having a port 19e adapted for varying degrees of registration with the control channel 13 in accordance with the rotation of the valve body, or to be completely closed by said body, the latter position being full clutching position. The body of each valve is maintained in sealed seated position by means of a thrust spring or like device 20, thereby avoiding leakage and compensating for wear. The valve body is first inserted in the cylindrical recess or cylinder provided therefor and held in place by cap 21. An operating stem 22 projects outwardly from the valve body and has secured thereon an arm or lever 23 which pivotally connects with the one end of an operating link 24, the opposite end of the link 24 being connected with a similar lever on an adjacent valve, so that the valves are operable in pairs.

The valves may be operated either manually or automatically, the operation in the present instance being automatic and originating through centrifugal governors 25 and 25', there being a pair of these governors, one governor for each pair of valves. Each governor is mounted on a bearing pin or shaft 26 which is secured to the adjacent face of the housing 5. A pin or stud 27 connects each of the operating links 24 with its respective governor.

To prevent the governor weights from throwing the valves into power position when the transmission unit is in neutral, governor control rods 28, 28' are provided and are each pivotally connected at one end by a ball and socket joint as at 28a to the extreme outer portion of the coacting governor and at the opposite end has a similar connection 28b with flange 29 mounted for limited sliding movement on shaft 6. Pins 30 and 30a, herein termed neutral safety pins, are each connected to the governors 25 and 25' and project outwardly so that they will contact the adjacent portion of the control rods 28, 28' when the parts approach neutral position, thereby making it impossible for the governor weights acting through links 24 to throw the valves 19a—19d to power or closed position.

When the parts are in neutral position as shown in Figs. 1 and 2, the fluid circulates from the channel 15 through ports or passages 18 into the control channel 13 and thence back into the reservoir 10 through port 31 formed in the body of valve 19b, note particularly Fig. 2, and coacting port 31a formed in the housing 5. Thus, when the valve 19b is turned so that the ports 31 and 31a register in whole or in part, the pressure in control channel 31 drops in direct proportion to the degree of registration, and when these ports are in complete registration the pressure is at a minimum, the plungers 12 then being free to move outwardly into the control channel through centrifugal force.

When the valves 19a—19d have been turned to a position which will create maximum pressure in the control channel 13, and the governors have reached a point where the pressure is at a maximum, a positive drive connection with the shaft 6 is effected through the medium of a positive drive sprocket 32 secured on the said shaft and provided with notches or teeth 32a in which teeth 33 and 33a formed on the governors engage. Thus, when the governor weights have moved into valve closing position, the tongues or teeth 33 and 33a engage the teeth 32a of the positive drive sprocket 32, thereby providing a positive connection between the clutch unit and the shaft 6 without depending upon fluid or oil pressure. In case all pressure is lost from the control channel 13 and the speed of the vehicle or member being driven exceeds the speed of the engine, then the notches 32a will cam against the teeth 33 and 33a and kick the governors outwardly, due to the fact that the shaft 6 and cam 7 thereon will then exceed the speed of the flywheel or like unit. When this occurs, the propeller cam, acting through a pump to be described, will build up sufficient pressure in the control channel 13 to cause the car to drive the motor until the speed of the vehicle is reduced to stopping or idling speed.

The flange 29 forms part of a manual control unit including flange 34 and bearing 35. The respective flanges 29 and 34 are provided with sleeves, the sleeve of the flange 29 being pressed into the inside of the bearing 35 and the sleeve of the flange 34 being pressed on the circumference of said bearing, thereby giving an independent action to the respective flanges. A pilot pin 36 fixed into the back bearing housing 16 and projecting through a registering hole formed in the flange 29 serves to maintain the said flange and back bearing in alignment. With this arrangement a suitable manual control member 34a may be connected between flanges 34 and 29 and serve as a means for moving flange 29 back and forth and thereby actuate the control valves 19. Bearing 35 permits flange 34 to turn with or independently of flange 29.

Figure 3:
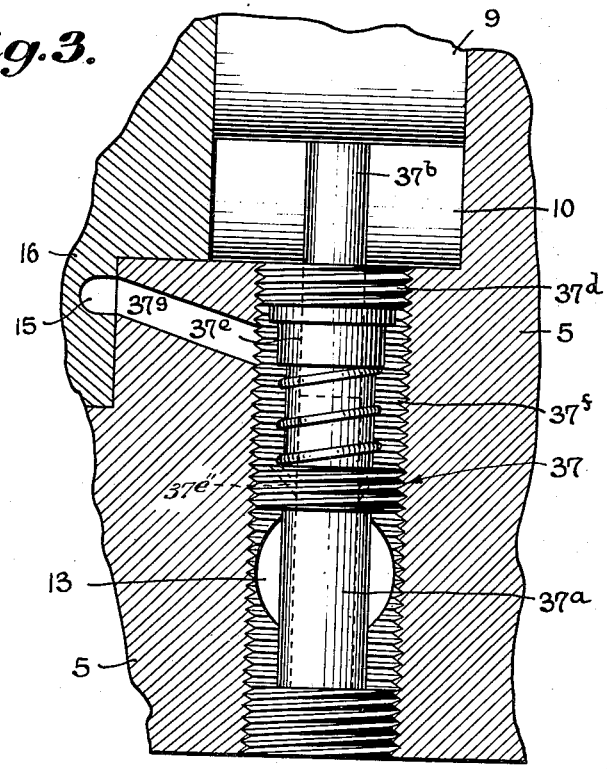
Fig. 3 is a detail sectional view of a fluid pump forming part of the unit of Figs. 1 and 2; and, Fig. 4 is a fragmentary view of a portion of the clutch housing particularly showing one of the by-pass ports and check valve therefor.

The fluid is maintained under suitable pressure through the medium of a specially constructed pump generally indicated at 37 and having a cylinder 37a in which a plunger 37b is mounted and adapted to contact the bearing 9 on the propeller cam 7, the plunger being constantly moved towards extended position through the medium of a spring 37c. An intake valve is provided and includes a seat 37d and a check valve member 37e, the seat being formed with a plurality of intake holes 37e' permitting one-way flow of the fluid from reservoir 10 into pump well 37f, backflow of the latter being checked by the member 37e. Ports 37e'' extend through the threaded annular enlargement of cylinder 37a and connect the bore in which plunger 37b has movement with the well 37f. The well 37f of the pump communicates with the distributing channel 15 through a port or passageway 37g, note particularly Fig. 3.

It will be seen that as the crank shaft 6 rotates, cam 7, acting through its bearing ring 9, will actuate plunger 37b, thereby creating pressure in the channel 15. When spring 37c forces plunger 37b inwardly, check valve member 37e is caused to unseat and clear intake holes or ports 37e' sufficiently to permit oil from reservoir 10 to flow into the pump well 37f through said holes or ports 37e', the oil also passing into the bore in which the said plunger is mounted through ports 37e'', thereby maintaining the well and bore full of oil at all times. When cam 7, acting through bearing ring 9, forces the plunger 37b outwardly, pressure will be exerted on the oil in the well 37f through ports 37e'' and oil is thus forced from the well and thence into channel 15, through port or passageway 37g, the valve member 37e being caused to seat and seal holes or ports 37e' and prevent backflow of oil into the chamber 10.

A counterbalance may be used to insure a perfect balancing action of the unit, and located back of the bearing 35, or inside of the propeller cam chamber. The weight of this balance should be such as to compensate for any unbalanced forces in the unit. However, the parts are so constructed, located and arranged as to automatically provide a self-balancing unit. The plunger of the pump 37 is constructed to balance the volume of oil opposite it when it is at the end of its travel. The remaining part of the pump can be readily balanced by the weight just noted.

In certain instances, particularly where a motor has a high pressure oil system, the oil pressure may be taken from the main pressure pump of the system as shown in Fig. 2 of the drawings, instead of utilizing a separate pump such as the pump 37 or the main pressure pump or system could be used in conjunction with pump 37 to ensure a supply of oil in reservoir 10. Since the unit is mounted directly on the crank shaft, the latter may be drilled as indicated in dotted lines in Fig. 2 to tap into the oil passage usually provided in said shafts so that the oil will be directed into the distributing channel 15. To complete the circulatory path of the oil or fluid, another hole may be drilled through the crank shaft end in communication with the central reservoir or chamber 10, this hole being in communication with the crank case of the motor.

A reverse transmission unit, not shown, is provided in the rear of the unit and may be of any conventional type, preferably one of simple construction.

In operation, the shaft 6 acting through the cam 7 and bearing ring 9 thereon actuates pump plunger 37b to constantly maintain fluid under pressure in the distributing channel 15, the fluid being restrained against backflow through the medium of the check valves 18a. When the parts are in neutral or non-driving position, as best shown in Fig. 2, the fluid circulates from the channel 15 through ports 18 into control channel 13 and thence back through port 31 in valve 19b and coacting part 31a in the housing 5 into chamber 10. When the respective valves are rotated, port 31 is moved out of registration with port 31a and thus return flow is checked, the pressure building up in channel 13 in direct proportion to this restriction in backflow. When the port 31a is completely closed, or blocked off, the respective portions of the channel 13 in which the plungers 12 are located will receive maximum fluid pressure which is directed against the plungers to drive the latter inwardly against bearing ring 9, which acts as a cam through the propeller cam 7. The unit is then in full clutch or driving position. When this point is reached, the governors will have reached a position where the teeth 33, 33a will have engaged the positive drive gear 32.

The declutching operation is the reverse of the foregoing, the valves 19a—19d being opened until the fluid circulates freely through the channel 15, ports 31, 31a, and reservoir or chamber 10. When pressure is relieved from the control channel 13, the plungers 12 fly outwardly through centrifugal force until they contact stops 14a.

In order to start the unit, a suitable manual control member such as that indicated at 34a in Fig. 2 may be used to prevent operation until it is desired to have the parts assume clutching position. However, once rotation of the unit is initiated, the governors 25, 25' take up the operation automatically.

The clutching action is smooth while at the same time positive once a full clutching position is reached. The parts are constructed for ease in installation in a restricted space, and wear on the parts brought into contact through the clutching operation is practically nil. When the parts are in neutral all pressure is relieved in the control channel 13 and the plungers are permitted to move outwardly so that they are out of frictional engagement with any moving parts. Due to the particular construction of the distributing channel 15 and separation of the control channel 13 into separate chambers through the medium of the valves 19, pressure may be built up in all portions of the control channel regardless of whether or not the control valves are in open or closed position. This insures adequate pressure at all times for operation of the plungers 12.

It will be understood that the foregoing and other advantages not herein specified are inherent in the improved transmission unit, and that certain changes in the construction and design and arrangement of the respective parts may be made without departing from the spirit or scope of the invention as defined by the appended claims.

What is claimed is:

1. In a fluid transmission system, a shaft, a cam on said shaft, a housing having a control channel therein and radial cylinders or bores communicating with said channel, plungers movably mounted in said cylinders and adapted to engage said cam, valves located in said channel and movable to open and closed position to restrict flow therethrough, a distributing channel in one-way flow communication with said control channel, means for creating fluid pressure in said distributing channel and through the latter in said control channel, and means for actuating said valves to restrict the flow in the control channel to create pressure on said plungers and drive the latter into clutching relation with said cam.

2. In a fluid transmission system, a shaft, a cam on said shaft, an annular housing having a main control channel formed therein and radially extending cylinders or bores in communication with said control channel, the housing around said cam being formed with a fluid chamber or reservoir, valves located in said channel between the respective cylinders, means communicating said control channel with said reservoir and controllable through one of said valves to by-pass the fluid back to the reservoir, a distributing channel in one-way flow communication with said control channel, and means for generating fluid pressure in said distributing channel and through the latter in said control channel, said valves when in open or in partially open position permitting flow of fluid from the control channel back to the reservoir.

3. In a fluid transmission system, a shaft, a cam on said shaft, a housing having a continuous main control channel formed therein and a central fluid reservoir or chamber, a neutral port communicating said channel with said chamber, valves mounted in said housing and arranged to restrict and close off circulation in said channel, a series of radial plungers mounted in said housing and having their outer ends exposed to the fluid pressure of the fluid in said control channel, said valves when actuated towards closed position restricting flow in said channel and causing pressure to build up against said plungers to drive the latter radially inwardly into clutching position, means simultaneously restricting passage of fluid through said neutral port, a distributing channel in one-way flow communication with said control channel, and means for building up fluid pressure in said distributing channel.

4. In a fluid transmission system, a shaft, a cam on said shaft, a housing adapted to fit into or provide a flywheel for an internal combustion engine, said housing being formed with a central chamber around said cam providing a fluid reservoir, a continuous annular main control channel, a neutral port communicating the main control channel with said reservoir, control valves in said main control channel and having a port adapted to register varying degrees with the control channel, said valves when turned towards closed position moving said port out of registration with the control channel to restrict flow therein and simultaneously restrict flow through said neutral port, said housing being formed with a plurality of spaced cylinders or bores extending radially from the said reservoir to the main control channel, plungers slidably mounted in said bores and adapted to coact with said cam to set up a clutching operation, another continuous channel functioning as a fluid distributing channel provided in said housing and having one-way fluid communication with said main control channel, and means for building up pressure in said distributing channel and through the latter in said main control channel.

5. In a fluid transmission system, a shaft, a cam on said shaft, a housing adapted to fit into or provide a flywheel for an internal combustion engine, said housing being formed with a fluid reservoir or chamber in the region of said cam and an annular continuous main control channel radially outwardly of said reservoir, a series of substantially equally spaced valves having valve bodies projecting into said main control channel and formed with ports adapted when turned toward closed position to restrict circulation of fluid in the main control channel, a neutral port communicating said main control channel with said reservoir and controllable through one of said valves to restrict circulation of fluid from the said channel to the said reservoir in proportion to the closing of the valve, another channel provided in the housing and functioning as a distributing channel with respect to said main control channel, ports communicating said distributing channel with said main control channel and having check valves therein to prevent return flow of fluid from the control channel to the distributing channel, and means for building up pressure on said fluid to force the latter under pressure through said distributing channel to the main control channel, the fluid when the said control valves are turned toward neutral position circulating from the main control channel back to said reservoir and when the said control valves are turned towards closed position restricting circulation of fluid and causing pressure to be built up in the control channel to drive the said plungers radially inwardly into clutching position with said cam.

6. In a fluid transmission system, a shaft, a cam on said shaft, a housing adapted to be mounted on said shaft for relative rotation with respect thereto, said housing being formed with a reservoir in the region of said cam and a continuous main control channel outwardly of said reservoir, the housing being provided with a series of cylinders or bores between said reservoir and said main control channel, plungers slidably mounted in said bores, a plurality of valves having valve bodies projecting into said main control channel and formed with ports adapted for varying degrees of registration with said channel, means exterior of said housing for operating said valves, a neutral port communicating said main control channel with said reservoir and controllable through one of said valves, another channel functioning as a distributing channel having one-way fluid communication with said main control channel, means for building up pressure on the fluid in said distributing channel and through the latter building up pressure in the main control channel, and centrifugal governors arranged to automatically operate said valves to open and close the latter in direct proportion to the speed of rotation of the housing, said valves when in open position permitting the plungers to move freely outwardly through centrifugal force into said control channel and when turned towards closed position restricting flow in said main control channel to thereby build up pressure against said plungers and drive the latter radially into clutching position with respect to the cam.

7. In a fluid transmission system, a shaft, a propeller cam on said shaft, a housing adapted to be built into or formed as part of a flywheel for an internal combustion engine, said housing being formed with a central chamber or fluid reservoir in the region of said cam and a continuous annular main control channel radially outwardly of said reservoir, a neutral port communicating said main control channel with said reservoir, a plurality of control valves spaced approximately ninety degrees apart and having valve bodies projecting into said main control channel and formed with ports adapted to register varying degrees with the channel, one of said valves being formed with a port adapted for varying degrees of registration with said neutral port, another channel functioning as a distributing channel having one-way fluid communication with said main control channel, means for building up fluid pressure in said distributing channel and through the latter in said main control channel, and means for actuating said valves, the latter when rotated towards closed position restricting flow in said main control channel causing pressure to build up therein and drive the plungers radially inwardly against said cam and when turned towards open or neutral position permitting free circulation of fluid in said main control channel and through said neutral port back into said reservoir.

8. In a fluid transmission system, a shaft, a cam on said shaft, a housing mounted on said shaft for free rotation with respect to said cam, said housing being formed with a central reservoir or chamber in the region of said cam and a main continuous control channel in fluid communication with said reservoir, valve means for restricting flow in said channel and also said neutral port, another channel functioning as a main distributing channel, means permitting one-way flow of fluid under pressure from the distributing channel to said control channel, and a pump arranged to build up pressure in said distributing channel, said pump being actuated through relative rotation between said housing and cam.

9. In a fluid transmission system, a shaft, a cam on said shaft, a housing mounted on said shaft for free rotation with respect to said shaft and cam, said housing being formed with a reservoir in the region of said cam and a main continuous control channel outwardly of said reservoir, radially movable plungers arranged to be actuated inwardly into clutching position with respect to said cam when pressure is built up in said control channel, a neutral port communicating said channel with said reservoir, and means for circulating fluid under pressure from said reservoir to said channel and back to the reservoir through said neutral port.

10. In a fluid transmission system, a shaft, a cam on said shaft, a housing mounted on said shaft for free relative rotation with respect to the shaft and cam, a series of radial plungers mounted in said housing and adapted to be driven inwardly with respect to said cam to set up a clutching action between the shaft and housing, a main continuous control channel in said housing, another channel functioning as a distributing channel, means providing one-way fluid communication between the distributing channel and control channel, and valve means for restricting fluid circulation in said control channel.

11. In a fluid transmission system, a shaft, a cam on said shaft, a housing mounted on said shaft for free rotation with respect to the cam and shaft, a series of plungers mounted for radial movement in said housing, means for establishing varying degrees of fluid pressure on said plungers to move the latter radially inwardly into clutching position with respect to said cam, valves for controlling the degree of pressure applied to said plungers, governor means for automatically actuating said valves, and means coacting with said governor means and said drive shaft for positively locking the housing to said shaft when the valves are actuated to full clutching position.

12. In a fluid transmission system, a shaft, a cam on said shaft, a housing mounted on said shaft for free relative rotation with respect to the shaft and cam, a series of radial movable plungers mounted in said housing, fluid means for exerting varying degrees of pressure on said plungers to move the latter radially into clutching engagement with said cam, valve means for controlling the fluid pressure applied to said plungers, governor means for actuating said valve means, and means for positively locking the housing to said shaft when the valves are turned to full clutching position, said means including a sprocket gear mounted on said shaft and a tooth carried by said governor means, the tooth engaging the sprocket when the governor means is moved through centrifugal force to full clutching position.

13. In a fluid transmission system, a shaft, a cam on said shaft, a housing mounted on said shaft and cam for free relative rotation with respect to the shaft, a series of radially movable plungers mounted in said housing, fluid means for applying pressure to said plungers to move the latter into and from clutching position with respect to said cam, valve means for controlling fluid pressure exerted on said plungers, centrifugal governors, means connecting said governors with said valves for actuating the latter, and means for preventing said governors from actuating said valve-actuating means when the governors are in neutral position.

14. In a fluid transmission system for motor vehicles having a circulating oil system under pressure, in combination with a shaft to be driven and another shaft such as the motor crankshaft of an internal combustion engine having a flywheel secured thereto and rotating therewith, a clutch housing mounted in the flywheel for rotation with the latter, a propeller cam on said first named shaft to be driven, said housing being formed with a central chamber around said cam providing a fluid reservoir, a continuous main control channel in said housing, a neutral port communicating the main control channel with said reservoir, control valves associated with the main control channel each having a port adapted to register varying degrees with said latter channel, said valves when turned toward closed position moving said ports out of registration with the control channel to restrict flow therein and simultaneously restrict flow through said neutral port, said housing being formed with a plurality of spaced cylinders or bores extending radially from the said reservoir to the main control channel, plungers slidably mounted in said bores and adapted to be coact with said cam to set up a clutching operation, another continuous channel functioning as a fluid distributing channel provided in said housing and having one way fluid communicating with said main control channel, and means for circulating oil under pressure from the main circulating system to said distributing channel and for returning the oil from said central chamber or reservoir back to the circulating system.

RALPH K. LORTON.